United States Patent
Suga et al.

(10) Patent No.: US 6,449,426 B1
(45) Date of Patent: *Sep. 10, 2002

(54) IMAGE SENSING AND RECORDING APPARATUS AND METHOD PERFORMING IMAGE SENSING OPERATIONS IN ACCORDANCE WITH FEATURES OF REMOVABLE RECORDING MEDIA

(75) Inventors: Akira Suga, Tokyo; Tomotaka Muramoto; Takao Sasakura, both of Yokohama, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/865,590

(22) Filed: May 29, 1997

(30) Foreign Application Priority Data

May 31, 1996 (JP) .............................. 8-138671

(51) Int. Cl.$^7$ ............................... H04N 3/225
(52) U.S. Cl. ........................ 386/117; 348/220; 348/232; 348/233; 386/46; 358/909.1
(58) Field of Search ................ 386/38, 117, 120, 386/95, 46; 358/906, 909.1; 348/220, 231, 333, 233, 232, 334, 222, 376; H04N 5/225

(56) References Cited

U.S. PATENT DOCUMENTS

| | | | |
|---|---|---|---|
| 4,982,291 A | * 1/1991 | Kurahashi et al. | 358/335 |
| 5,034,804 A | * 7/1991 | Sasaki et al. | 386/38 |
| 5,040,068 A | * 8/1991 | Parulski et al. | 358/209 |
| 5,067,029 A | * 11/1991 | Takahashi | 386/38 |
| 5,130,813 A | * 7/1992 | Oie et al. | 358/335 |
| 5,138,459 A | * 8/1992 | Roberts et al. | 358/209 |
| 5,155,638 A | 10/1992 | Aikawa et al. | |
| 5,379,069 A | * 1/1995 | Tani | 386/38 |

(List continued on next page.)

FOREIGN PATENT DOCUMENTS

| | | |
|---|---|---|
| EP | 0473516 A2 | 3/1992 |
| EP | 0548547 A2 | 6/1993 |
| EP | 0594992 A1 | 5/1994 |
| JP | 5103291 | 4/1993 |
| JP | 6-86214 | 3/1994 |
| JP | 6-078263 | 3/1994 |
| JP | 6-098247 | 4/1994 |
| JP | 7-322195 | 3/1995 |
| JP | 7-298112 | 11/1995 |

OTHER PUBLICATIONS

Akito, "Electronic Still Camera", Apr. 23, 1994, Patent Abstracts of Japan Pub # 05103291.

Primary Examiner—Vincent F. Boccio
(74) Attorney, Agent, or Firm—Morgan & Finnegan, LLP

(57) ABSTRACT

In an image sensing and recording apparatus capable of recording image data on plural types of removable recording media, a recording speed of a recording medium for recording image data is recognized, then image sensing modes, including a single image sensing mode and a sequential image sensing mode, which are set in advance are classified into available image sensing mode and unavailable image sensing mode on the basis of the recognized recording speed. Further, image sensing parameters, including numbers of pixels per frame and frame rates for the sequential image sensing mode, which are set in advance are also classified into available image sensing mode and unavailable image sensing mode on the basis of the recognized recording speed of the recording medium. A user selects and sets desirable image sensing mode among the available image sensing mode or modes and desirable image sensing parameter or parameters among the available image sensing parameter or parameters, then performs an image sensing operation.

64 Claims, 15 Drawing Sheets

U.S. PATENT DOCUMENTS

| | | | |
|---|---|---|---|
| 5,402,170 A | * | 3/1995 | Parulski et al. .............. 348/376 |
| 5,424,772 A | * | 6/1995 | Aoki et al. .................. 348/220 |
| 5,434,618 A | * | 7/1995 | Hayashi et al. ........... 358/909.1 |
| 5,467,129 A | * | 11/1995 | Suzuki ....................... 348/231 |
| 5,517,241 A | * | 5/1996 | Adachi et al. .............. 348/231 |
| 5,526,047 A | | 6/1996 | Sawanobori |
| 5,576,757 A | * | 11/1996 | Roberts et al. ............. 348/220 |
| 5,576,758 A | * | 11/1996 | Arai et al. .................. 348/231 |
| 5,631,701 A | * | 5/1997 | Miyake ................... 358/909.1 |
| 5,638,184 A | | 6/1997 | Fujimoto et al. |
| 5,640,202 A | | 6/1997 | Kondo et al. |
| 5,734,424 A | * | 3/1998 | Sasaki ........................ 348/220 |
| 5,764,286 A | * | 6/1998 | Kawamura et al. ...... 358/909.1 |
| 5,821,996 A | * | 10/1998 | Kawamura et al. .......... 348/233 |
| 5,883,666 A | * | 3/1999 | Kyuma et al. .............. 348/220 |
| 5,930,542 A | * | 7/1999 | Yamamoto et al. ......... 348/233 |

* cited by examiner

WARNING!

Designated frame rate can not be selected
unless the number of pixels per frame is set
to equal or less than 320 × 240.

Press SET button to return to the previous screen.

IMAGE SENSING AND RECORDING APPARATUS AND METHOD PERFORMING IMAGE SENSING OPERATIONS IN ACCORDANCE WITH FEATURES OF REMOVABLE RECORDING MEDIA

BACKGROUND OF THE INVENTION

The present invention relates to an image sensing and recording apparatus and method and, more particularly, to an image sensing and recording apparatus and method capable of sensing a single still image or sequential still images by performing image sensing operations in accordance with features of removable recording media for recording the obtained image or images.

A digital camera which records a digitized still image on a removable recording medium, such as a memory card and a hard disk card of PC Card Standard, has become popular with the advance of digital technology. As for image sensing modes of such digital camera, there are a single image sensing mode for recording a single still image and a sequential image sensing mode for sequentially recording a plurality of still images, and these modes are important as functions of a camera. Further, by increasing the speed for sensing sequential images to a rate of 30 fps (frames per second), it is possible to expand the utilization purpose of the digital camera to a camcoder. Furthermore, as a feature of the digital camera, an image can be recorded by arbitrary number of pixels per frame, compression ratio, and frame rate.

Meanwhile, there are various recording media conforming to the PC Card Standard, and their properties and capacities differ. Generally speaking, the speed for recording on memory card is slow and the capacity of the memory card is small, however, it superiors in enduring various environmental conditions. In contrast, the speed for recording on hard disk card is fast and the capacity of hard disk card is large, however, it is inferior in environmental endurance. Therefore, conventionally a user selects a recording medium in accordance with his/her purpose of utilization and installs it in a digital camera, then sets an image sensing mode and image sensing parameters in the digital camera.

When the user selects a recording medium on which image data can be recorded slowly and sets the digital camera to the sequential image sensing mode, there are cases in which sequential images can not be adequately recorded in a frame rate and a selected number of pixels to be recorded per frame. For example, some frames may be dropped and not recorded. Which image sensing mode and which image sensing parameters can be used are found as a result of trial-and-error efforts by the user, which is a considerable load on the user.

SUMMARY OF THE INVENTION

The present invention has been made in consideration of the above situation, and has as its object to provide an image sensing and recording apparatus and method capable of sensing and recording an image or images without failure right after changing recording media without troubling a user.

According to the present invention, the foregoing object is attained by providing an image sensing and recording apparatus capable of recording image data on plural types of removable recording media, the apparatus comprising: recognition means for recognizing a recording speed of a recording medium; available mode determination means for classifying image sensing modes which are set in advance into available image sensing mode and unavailable image sensing mode in accordance with the recording speed recognized by the recognition means; and available parameter determination means for classifying image sensing parameters which are set in advance into available image sensing parameter and unavailable image sensing parameter.

The foregoing object is also attained by providing an image sensing and recording method for recording image data on plural types of removable recording media, the method comprising: a recognition step of recognizing a recording speed of a recording medium; an available mode determination step of classifying image sensing modes which are set in advance into available image sensing mode and unavailable image sensing mode in accordance with the recording speed recognized at the recognition step; and an available parameter determination step of classifying image sensing parameters which are set in advance into available image sensing parameter and unavailable image sensing parameter.

With the aforesaid configuration, available image sensing mode or modes and available image sensing parameter or parameters which are determined in accordance with the recording speed of the recording medium selected by a user are easily recognized by the user, thereby it is possible to perform image sensing and recording operation without failure.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

<First Embodiment>

Figure 8:
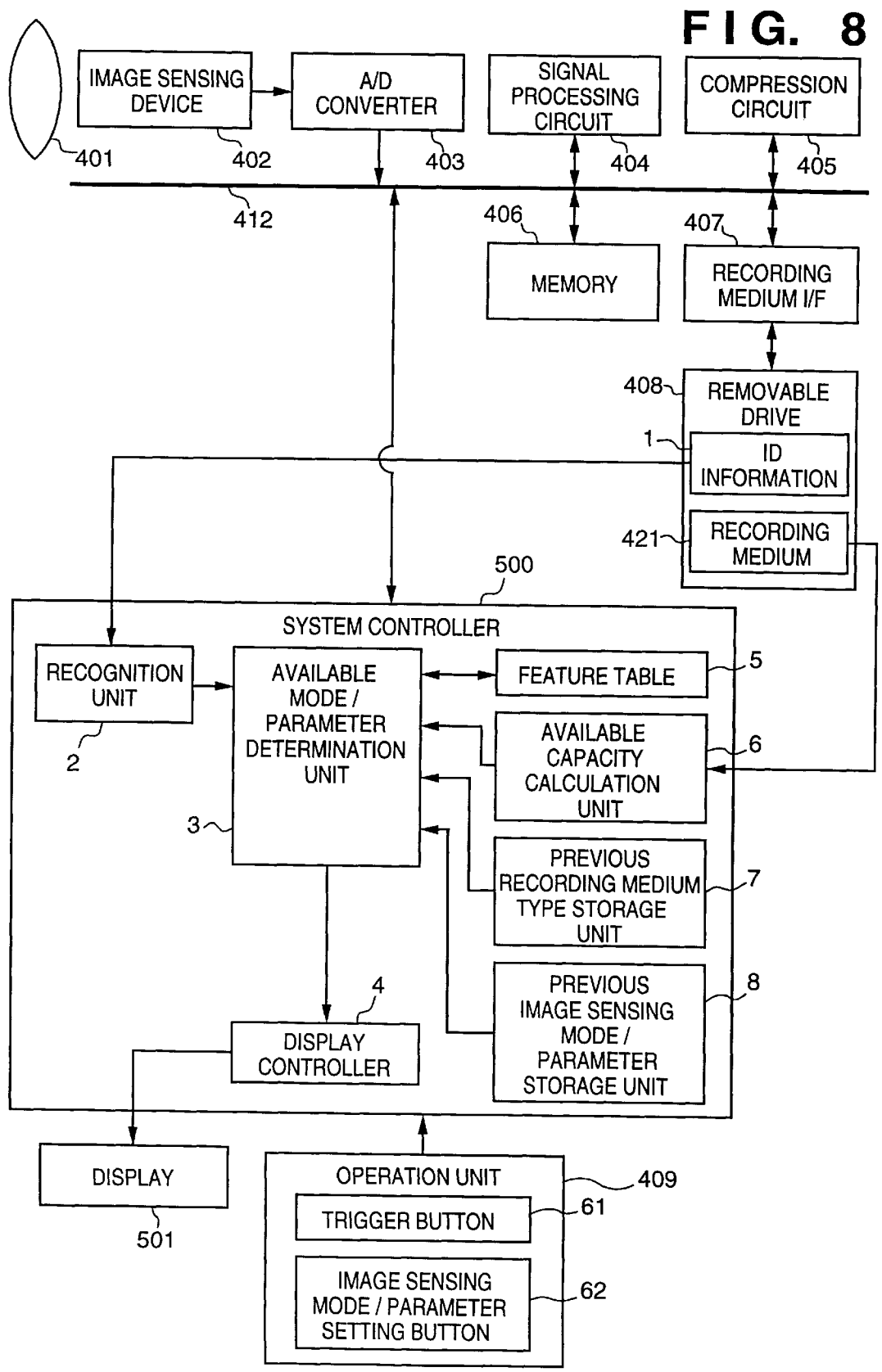
FIG. 8 is a block diagram illustrating a configuration of the image sensing and recording apparatus according to the first embodiment.

FIG. 8 is a block diagram illustrating a configuration of an image sensing and recording apparatus according to a first embodiment of the present invention. In FIG. 8, reference numeral 401 denotes a lens unit; 402, a solid-state image sensing device (simply referred by "image sensing device", hereinafter); 412, a data bus; 403, an analog-digital (A/D) converter for performing analog-digital conversion on the output from the image sensing device 402; 406, a memory for temporally storing the output from the A/D converter 403, i.e., raw data of the image sensing device 402; 404, a signal processing circuit for applying signal processes to the raw data of the image sensing device 402 stored in the memory 406 to convert it into image data suitable for recording; 405, a compression circuit for compressing the processed image data; 421, a recording medium for recording the compressed image data; 408, a removable drive including the recording medium 421; and 407, a recording medium interface (I/F) for communicating data between the data bus 412 and the removable drive 408 when reading and writing the compressed image data from/to the recording medium.

Further, reference numeral 1 denotes recording medium type identification information (simply referred by "ID information", hereinafter). When a PC card is used as the removable drive, for example, vendor name, name of a drive type, and so on, can be obtained from table information as the ID information 1. Reference numeral 500 denotes a system controller for controlling an entire operation of the image sensing and recording apparatus; 409, an operation unit for a user to operate the image sensing and recording apparatus; and 501, a display for a user to select and confirm image sensing mode or modes and image sensing parameter or parameters.

Furthermore, reference numeral 61 denotes a trigger button for a user to trigger the image sensing operation; 62, an image sensing mode/parameter setting button used by the user for setting the image sensing mode and the image sensing parameter or parameters; 2, a recording medium type recognition unit (simply referred by "recognition unit", hereinafter) for recognizing the type of the recording medium 421 on the basis of the ID information 1; 5, a recording medium feature table (simply referred by "feature table", hereinafter) storing features of recording media in correspondence with the types of the recording media; and 3, an available image sensing mode/parameter determination unit (referred by "available mode/parameter determination unit", hereinafter) for obtaining the feature of the recording medium on the basis of the type of the recording medium recognized by the recognition unit 2 and the feature table 5, and determining available image sensing mode or modes and available image sensing parameter or parameters on the basis of the obtained feature.

In the image sensing and recording apparatus according to the first embodiment, there are two modes as the image sensing modes; a single image sensing mode for recording a single still image, and a sequential image sensing mode for sequentially sensing a plurality of still images at a predetermined frame rate. Further, as for the image sensing parameters, there are the number of pixels (or image size) to be recorded per frame (referred as "number of recording pixel", hereinafter) which determines the numbers of pixels in the vertical and horizontal directions in a frame, a frame rate for sequential image sensing operation, and a compression ratio. Reference numeral 4 denotes a display controller for controlling the displayed contents on the display 501; 6, an available capacity calculation unit for calculating a currently available capacity of the recording medium 421; 7, a previous recording medium type storage unit for storing the type of the previous recording medium 421; and 8, a previous image sensing mode/parameter storage unit for storing the image sensing mode and the image sensing parameter or parameters used for the previous recording medium.

A compression ratio used in the first embodiment is briefly explained below.

In digital camera, the JPEG (Joint Photographic Experts Group) compression method is widely adopted. In the JPEG compression method, when a compression ratio is set high, quality of an image deteriorates noticeably because of block noises, for example. Therefore, a compression ratio is usually determined in accordance with the desired quality of a resultant image. In general cases, a compression ratio between 1/3 and 1/5 is used for obtaining an image of high quality, a compression ratio about 1/10 is selected for obtaining an image of normal quality, and a compression ratio between 1/25 and 1/50 is used if an image of low is enough for a user's purpose. Further, the JPEG compression method essentially performs variable length compression. Thus, a rough target compression ratio is determined from a quantization table, however, an actual compression ratio varies depending upon a sensed image. In the first embodiment, it is assumed to consistently use a quantization table which realizes a compression ratio of about 1/10, however, the present invention is not limited to this, and a desired quantization table may be selected by a user.

Figure 1:
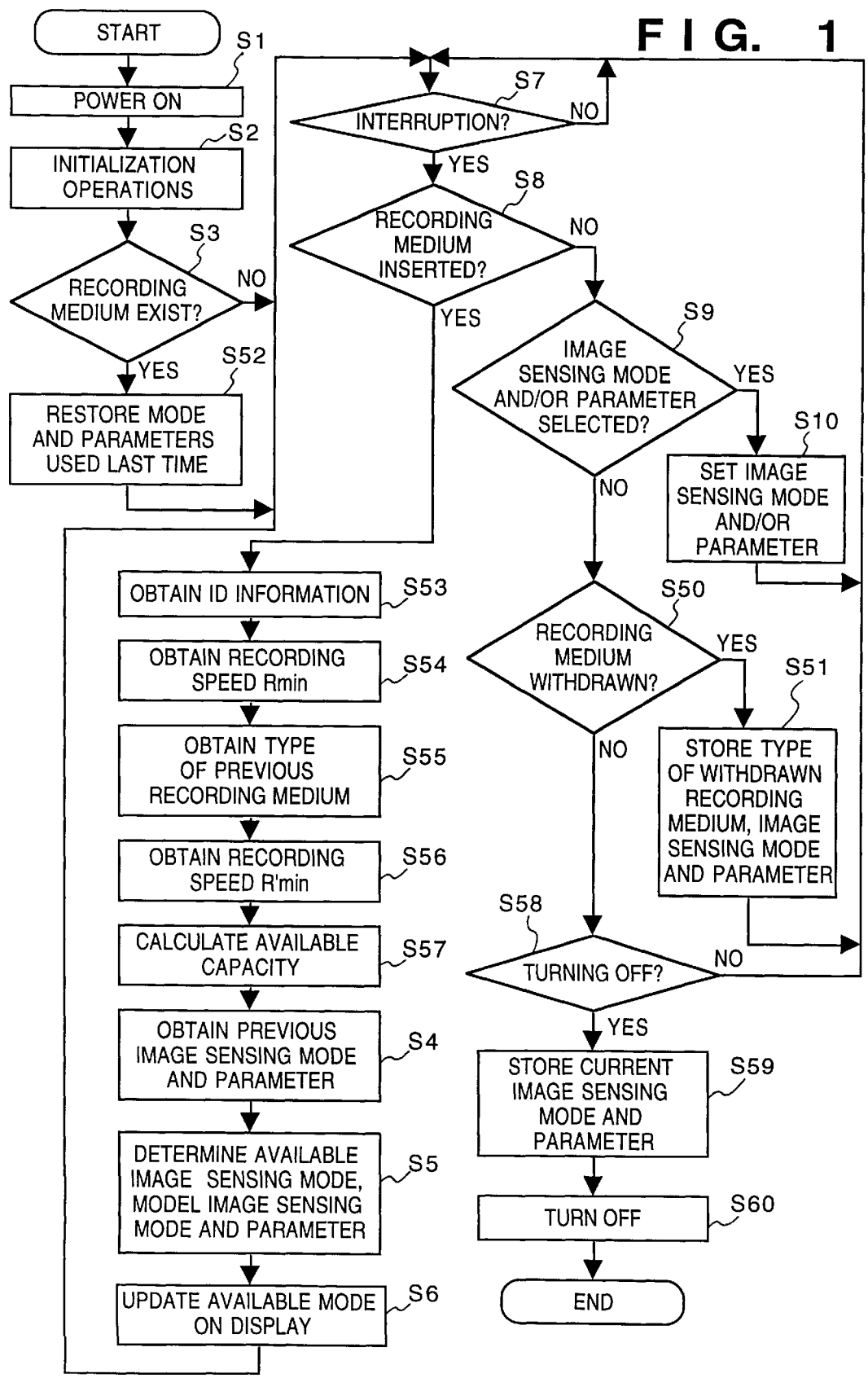
FIG. 1 is a flowchart showing an operational sequence of an image sensing and recording apparatus according to a first embodiment.

FIG. 1 is a flowchart showing an operational sequence of the image sensing and recording apparatus according to the first embodiment. The operation of the first embodiment is described with reference to FIGS. 1 and 8.

After a user turn on the power of the image sensing and recording apparatus at step S1, the system controller 500 performs various initialization operations at step S2.

Next at step S3, if it is determined that a recording medium 421 already exists, then at step S52, an image sensing mode and an image sensing parameter or parameters previously used before the power is turned off last time are restored. Thereafter, the process moves to step S7. Referring to FIG. 1, step S7 is an interruption waiting loop, and the process waits until an interruption signal is received. When an interruption signal is received, the process proceeds to the next step. If insertion of a recording medium 421 is detected at step S8 (Note, when a recording medium stays in or when no recording medium is inputted, then step S8 becomes No. In the case of the first embodiment as shown in FIG. 8, the insertion of the removable drive 408 substitutes for the insertion of the recording medium 421), then the available mode/parameter determination unit 3 obtains the ID information 1 read through the recognition unit 2 at step S53.

Next at step S54, the available mode/parameter determination unit 3 uses the ID information 1, obtained at step S53, as a key to the feature table 5 to obtain a recording speed, Rmin, of the recording medium 421. At step S55, the available mode/parameter determination unit 3 obtains the type of the previous recording medium 421, used before changing recording media, from the previous recording medium type storage unit 7.

At step S56, the available mode/parameter determination unit 3 uses the ID information 1 of the previous recording medium obtained at step S55 as a key to the feature table 5 to obtain the recording speed R'min of the previous recording medium 421. Next at step S57, the available mode/parameter determination unit 3 obtains an available capacity of the current recording medium 421 calculated by the available capacity calculating unit 6.

At step S4, the available mode/parameter determination unit 3 obtains the image sensing mode and the image sensing parameter or parameters used for the previous recording medium from the previous image sensing mode/parameter storage unit 8. At step S5, the available mode/parameter determination unit 3 determines an available image sensing mode or modes, image sensing mode to be a model (referred by "model image sensing mode", hereinafter), and image sensing parameter or parameters to be a model (referred by "model image sensing parameter", hereinafter) on the basis of the information obtained at steps S53 to S57. Next at step S6, displayed contents on the display 501 are changed so as to reflect the determined available image sensing mode or modes.

When no insertion of a recording medium 421 is detected at step S8 (No at step S8, including a case where a recording medium stays in), the process proceeds to step S9. When it is judged that selection of image sensing mode and/or image sensing parameter or parameters is performed by using the image sensing mode/parameter setting button 62 at step S9 (Yes at step S9), then the image sensing mode and/or image sensing parameter or parameters are set at step S10. Thereafter, the process returns to step S7. The detailed processes performed in steps S9 and S10 will be explained later in detail with reference to FIGS. 3 to 7 and FIG. 16.

When it is judged at step S9 that selection of image sensing mode and/or image sensing parameter or parameters is not performed (No at step S9), then the process moves to step S50. At step S50, if withdrawal of the recording medium 421 is detected (Yes at step S50, note, when a recording medium does not exist or when a recording medium stays in, then step S50 becomes No), then the system controller 500 stores the type of the withdrawn recording medium in the previous recording medium type storage unit 7 at step S51, and the image sensing mode and the image sensing parameter or parameters used for the withdrawn recording medium 421 in the previous image sensing mode/parameter storage unit 8. Thereafter, the process returns to step S7.

When no withdrawal of the recording medium 421 is detected at step S50 (No at step S50, including a case where recording medium does not exist), the process goes to step S58. When it is determined that the operation for turning off the image sensing and recording apparatus is designated at step S58, then the current image sensing mode and image sensing parameter or parameters are stored at step S59, then the image sensing and recording apparatus is actually turned off at step S60.

Whereas, if it is determined at step S58 that the operation for turning off the image sensing and recording apparatus is not designated, then the process returns to step S7 to perform other process.

Figure 2:
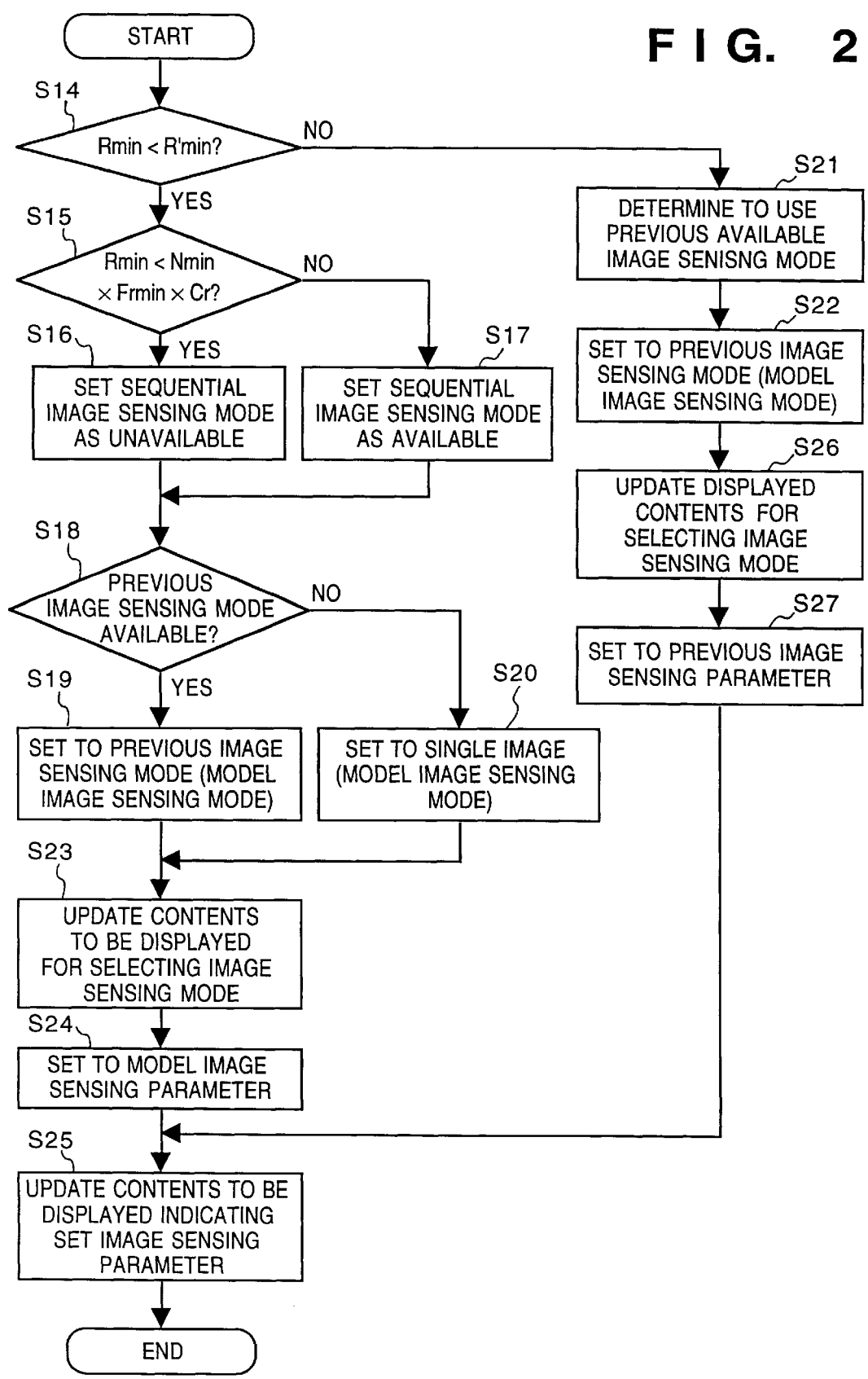
FIG. 2 is a flowchart showing a detailed flow of step S5 in FIG. 1.

FIG. 2 is a flowchart showing a detailed operation for determining the available image sensing mode or modes and the model image sensing parameter or parameters performed at step S5 in FIG. 1. At step S14 in FIG. 2, the recording speed R'min (pixel/sec.) of the previous recording medium 421 and the recording speed Rmin (pixel/sec.) of the current recording medium 421 are compared, and if Rmin is smaller then R'min, the process moves to step S15. At step S15, when the minimum number of possible pixels per frame, Nmin (pixel/frame), the minimum possible frame rate, Frmin (frame/sec.), and the minimum possible compression ratio, Cr, are given, and if the inequality, $$Rmin < Nmin \times Frmin \times Cr$$

is satisfied, the recording speed of the recording medium 421 is not fast enough to record images in the sequential image sensing mode even when the minimum number of pixels and the minimum frame rate are set. Therefore, the sequential image sensing mode is set as "not available" at step S16. Whereas, if the above equation is not satisfied, then the sequential image sensing mode is set as "available" at step S17.

Next at step S18, if the previous image sensing mode for the previous recording medium is determined to be "available" at step S18, then the previous image sensing mode (model image sensing mode) is set at step S19. Whereas, if it is determined that the previous image sensing mode is "not available" at step S18, then the single image sensing mode (model image sensing mode) is set at step S20. Then, at step S23, the contents to be displayed on the display 501 used for selecting the image sensing mode are updated in accordance with the results of step S19 or S20. Next at step S24, the model image sensing parameter or parameters are automatically set, and the contents to be displayed indicating the set image sensing parameter or parameters are updated at step S25.

Whereas, if Rmin≧R'min is determined at step S14 (No at step S14), then the previous available image sensing mode or modes are determined to be also available for the current recording medium at step S21, and the image sensing mode (model image sensing mode) is set to the previous image sensing mode set when using the previous recording medium at step S22. Next at step S26, the contents to be displayed used for selecting the image sensing mode are updated at step S26. At step S27, the previous image sensing parameter or parameters for the previous recording medium are set. At step S25, the displayed contents used for selecting the image sensing parameter or parameters are updated.

Figure 14:
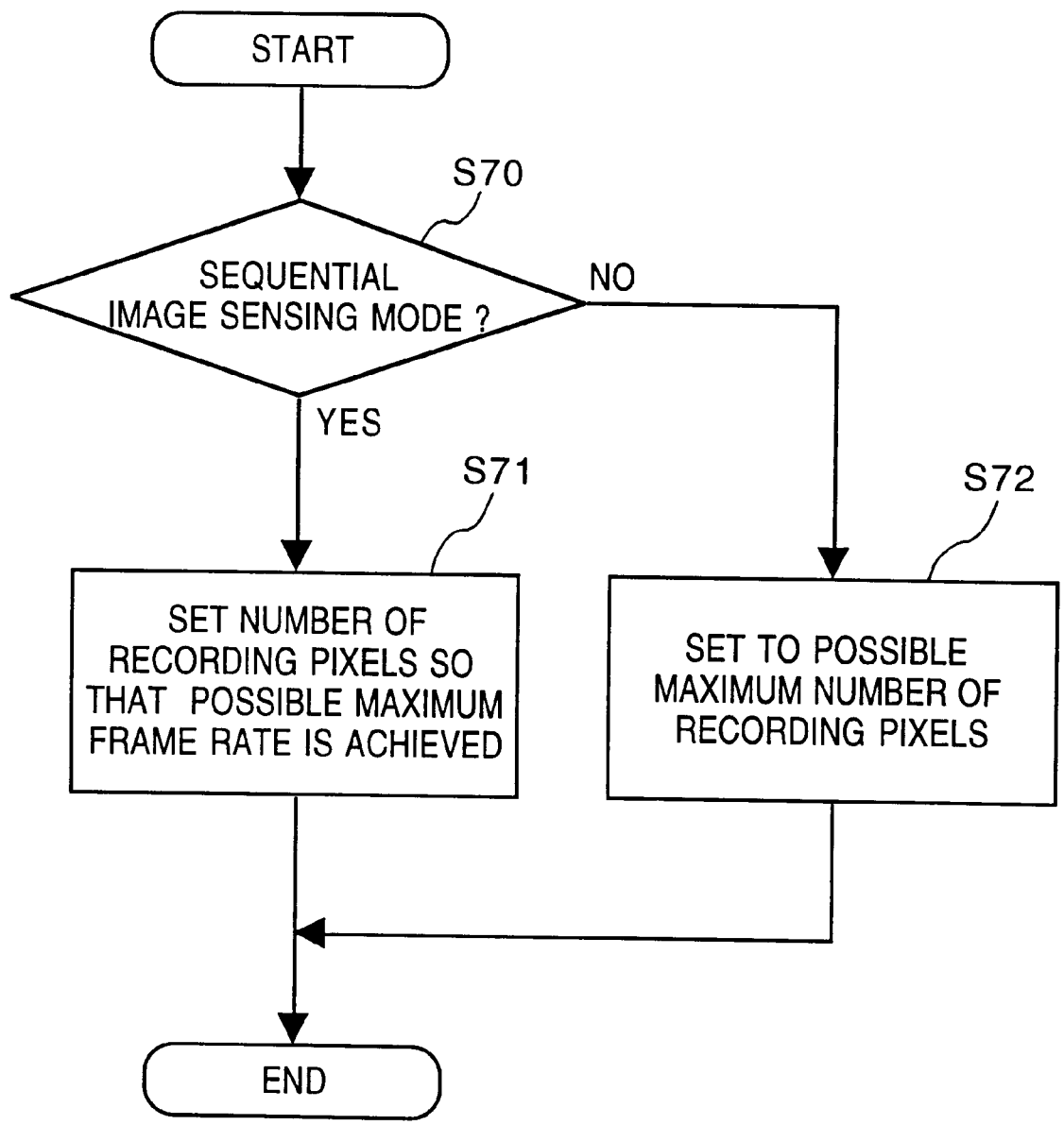
FIG. 14 is a flowchart showing a sequence for setting model image sensing parameter or parameters.

FIG. 14 is a flowchart showing a sequence for setting a model image sensing parameter or parameters performed at step S24 in FIG. 2. Referring to FIG. 14, when it is determined that the sequential image sensing mode is set at step S70 (Yes at step S70), the number of pixels per frame is set so that the possible maximum frame rate is achieved under the conditions of the given recording speed and available capacity of the recording medium 421 at step S71. Whereas, if it is determined that the sequential image sensing mode is not set at step S70 (No at step S70), the possible maximum number of pixels per frame is set within the available capacity of the recording medium 421 at step S72.

The number of pixels per frame to be a model (referred as "model number of pixels", hereinafter) is determined so as to achieve the possible maximum frame rate in the sequential image sensing mode, and this is called "frame-rate priority mode". In contrast, it is possible to determine the model number of pixels per frame so as to achieve the possible maximum number of pixels under the conditions of the given recording speed and available capacity of the recording medium, and this is called "number-of-pixel priority mode".

Figure 12:
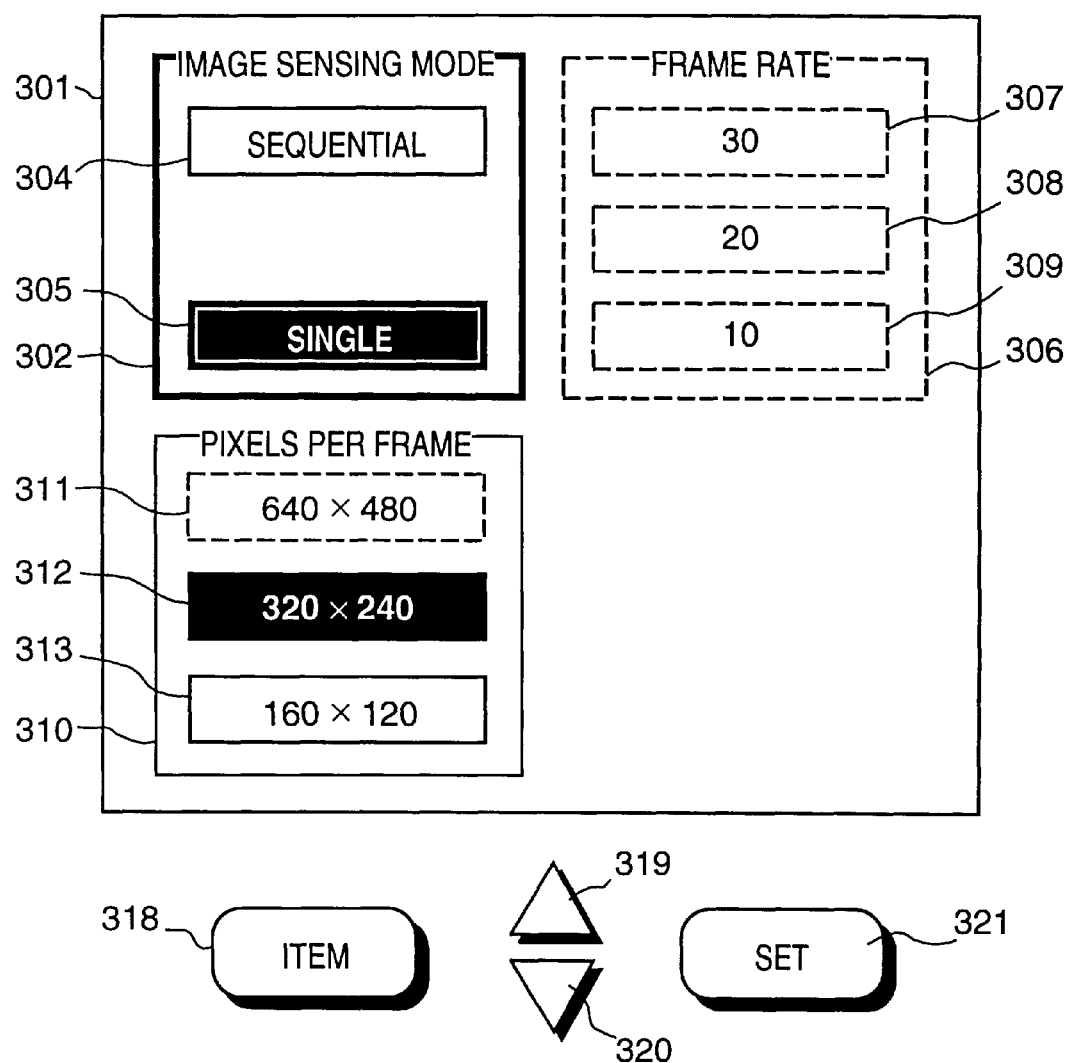
FIG. 12 shows an example of a displayed image for setting to a single image sensing mode.
Figure 13:
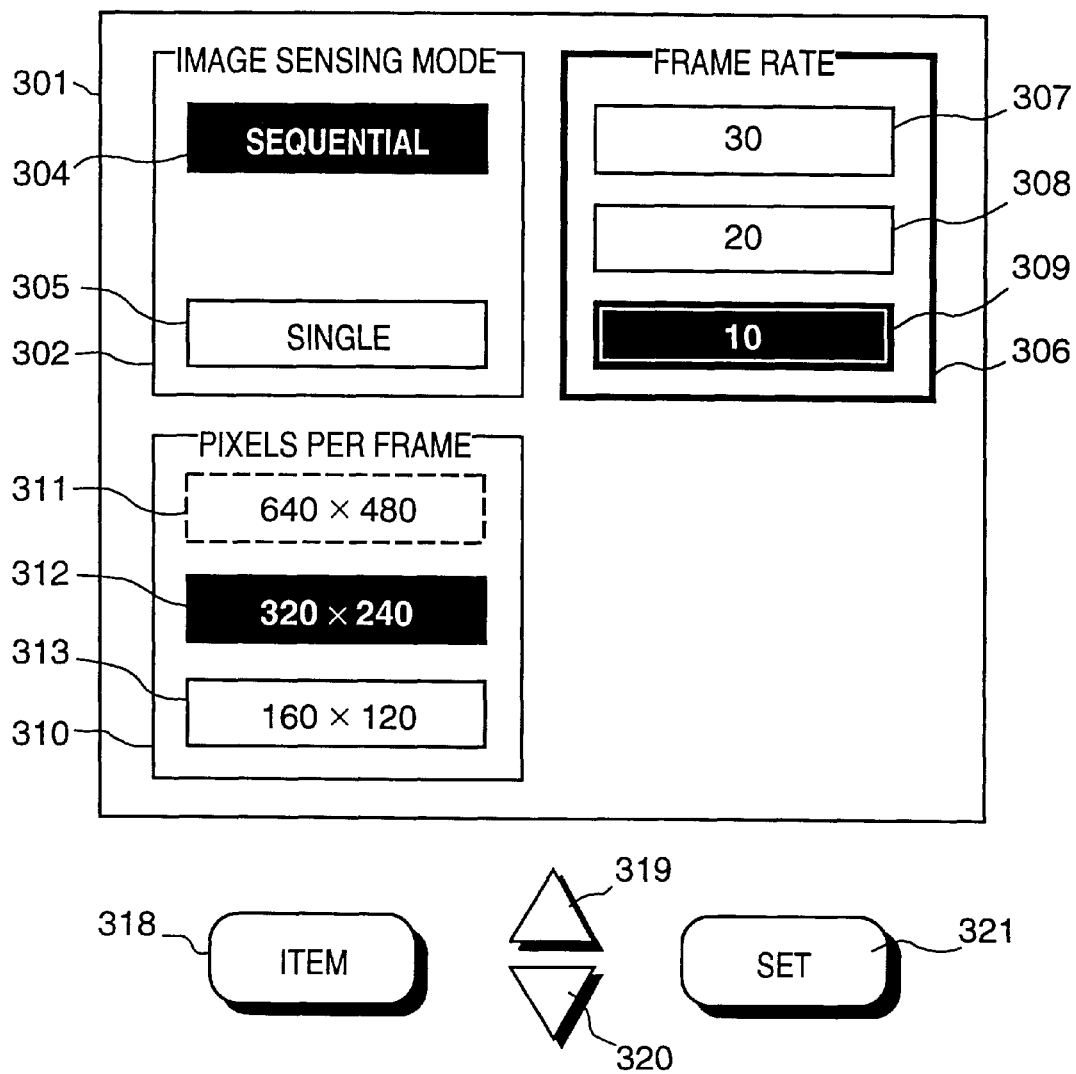
FIG. 13 shows an example of a displayed image for selecting a frame rate.

FIGS. 3 to 7 and 16 are flowcharts showing detailed operation for a user to select an image sensing mode and an image sensing parameter or parameters. Further, FIGS. 11 to 13 are views showing examples of displayed contents used for setting the image sensing mode and the image sensing parameter or parameters.

Figure 11:
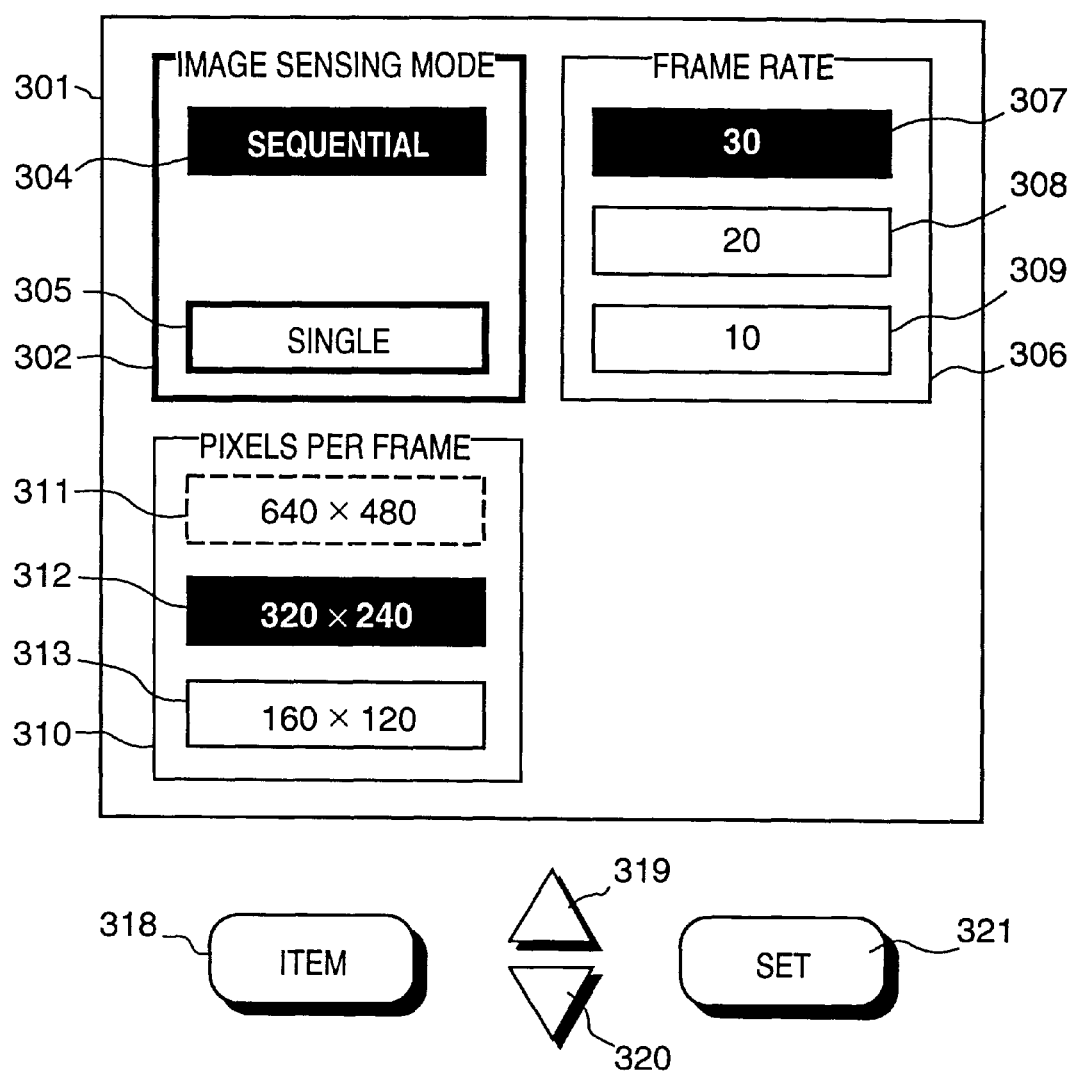
FIG. 11 shows an example of a displayed image for setting to a sequential image sensing mode.

In FIG. 11, reference numeral 301 denotes a display screen; 302, a portion for displaying image sensing modes; 304 and 305, choices of the sequential image sensing mode and the single image sensing mode, respectively; 306, a portion for displaying frame rates; 307 to 309, choices of the frame rates; 310, a portion for displaying numbers of pixels per frame; 311 to 313, choices of the numbers pixels; 318, an item selection button for the user to choose an item to be set; 319 and 320, an up-button and a down-button, respectively, for selecting one of the choices for each item; and 321, a set button for setting the selected choices.

Each time the item selection button 318 is pressed, the item to be set moves in an order from the portion 302 for displaying image sensing modes to the portion 306 for displaying frame rates, then to the portion 310 for displaying numbers of pixels per frame, for example. A line enclosing the selected item to be set is displayed as a thick line. Further, with the up-button 319 and the down-button 320, it is possible to move between the choices in each item to be set. A line enclosing the selected choice is displayed as a thick line. Further, a line enclosing unavailable item and/or choice is displayed as a pale line. By selecting one of the choices and pressing the set button 321, the image sensing mode or the image sensing parameter is set. The selected choice is highlighted, e.g., by displaying in reversed color.

In FIG. 11, an example of a display screen when the user sets an image sensing mode. In this case, the image sensing mode is automatically set to the sequential image sensing mode, the model frame rate to 30 fps (frames per second), and the model number of pixels to 320×240 (320 pixels in the horizontal direction and 240 pixels in the vertical direction) per frame. In this case, since the number of pixels of 640×480 is not available due to the recording speed of the recording medium, the choice 311 is displayed in pale color. When the choice of the single image sensing mode 305 is selected by using the up-button 319 and/or the down-button 320 while the line enclosing the portion 302 for image sensing modes is displayed as the thick line, the outside line of the choice of the single image sensing mode 305 is displayed with a thick line as shown in FIG. 12. At this point, when the set button 321 is pressed, the choice of the single image sensing mode 305 is displayed in reversed color to indicate that the single image sensing mode is set, and all the contents in the portion 306 for setting a frame rate is displayed in pale color to indicate that it is not possible to select a frame rate. Further, the available choices for the number of pixels, determined in accordance with the available capacity of the memory, are displayed in the dark color to indicate that selection can be made out of these choices.

Figure 16:
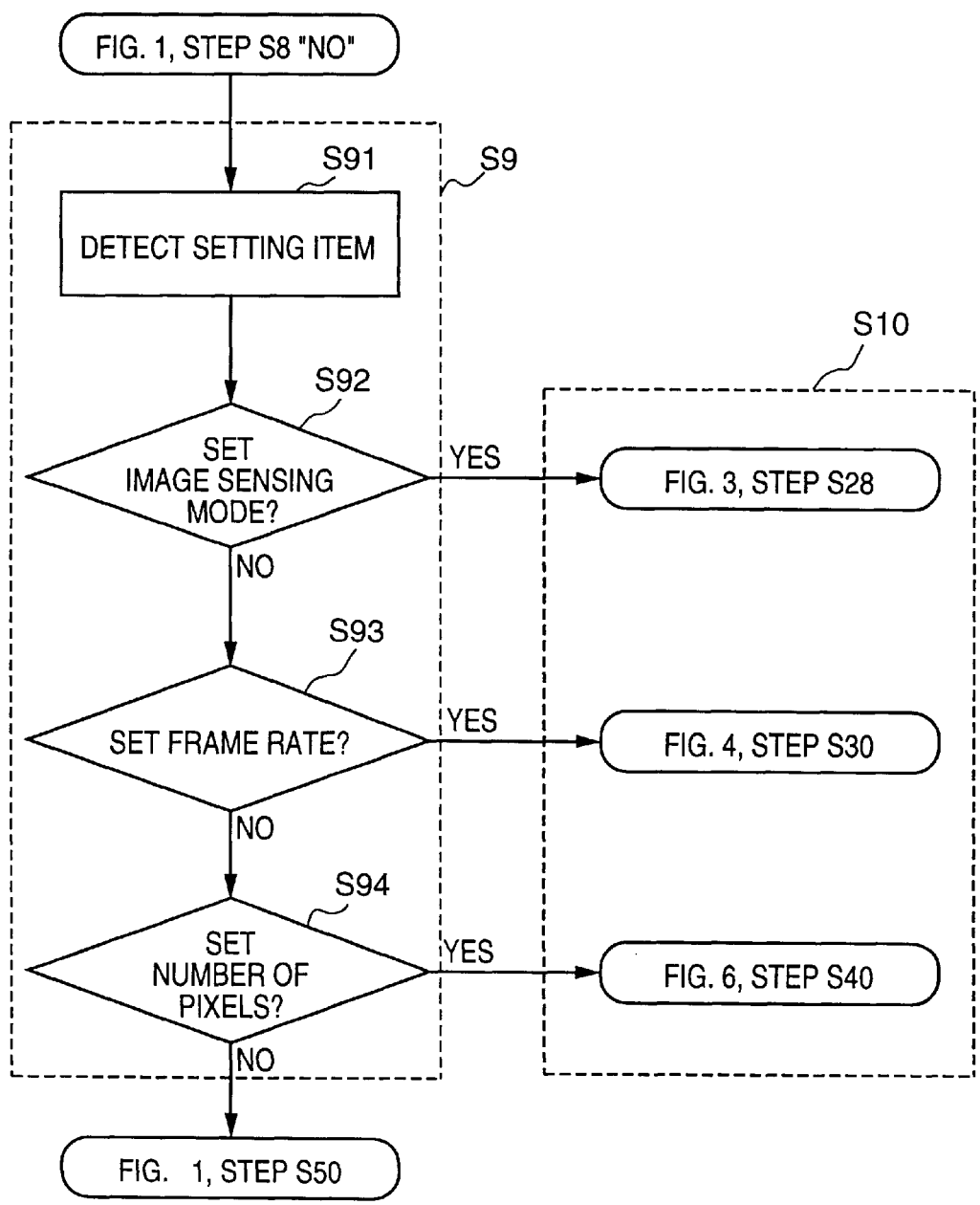
FIG. 16 is a flowchart showing an operation sequence at steps S9 and S10 in FIG. 1.

FIG. 16 is a flowchart showing an operation sequence at step s S9 and S10 in FIG. 1. First at step S91, which item is to be set is detected. Then at step S92, if it is determined that the detected result indicates to set an image sensing mode ("Yes" at step S92), then the process moves to step S28 in FIG. 3. if "No" at step S92 the process proceeds to step S93, where whether the detected result indicates to set a frame rate is checked. If "Yes" at step S93, then the process moves to step S30 in FIG. 4, whereas, if "No" at step S93, then the process proceeds to step S94. At step S94, if the detected result indicates to set the number of pixels ("Yes" at step S94), then the process goes to step S40 in FIG. 6. Whereas, if "No" at step S94, the process moves to step S50 in FIG. 1, as described above.

Figure 3:
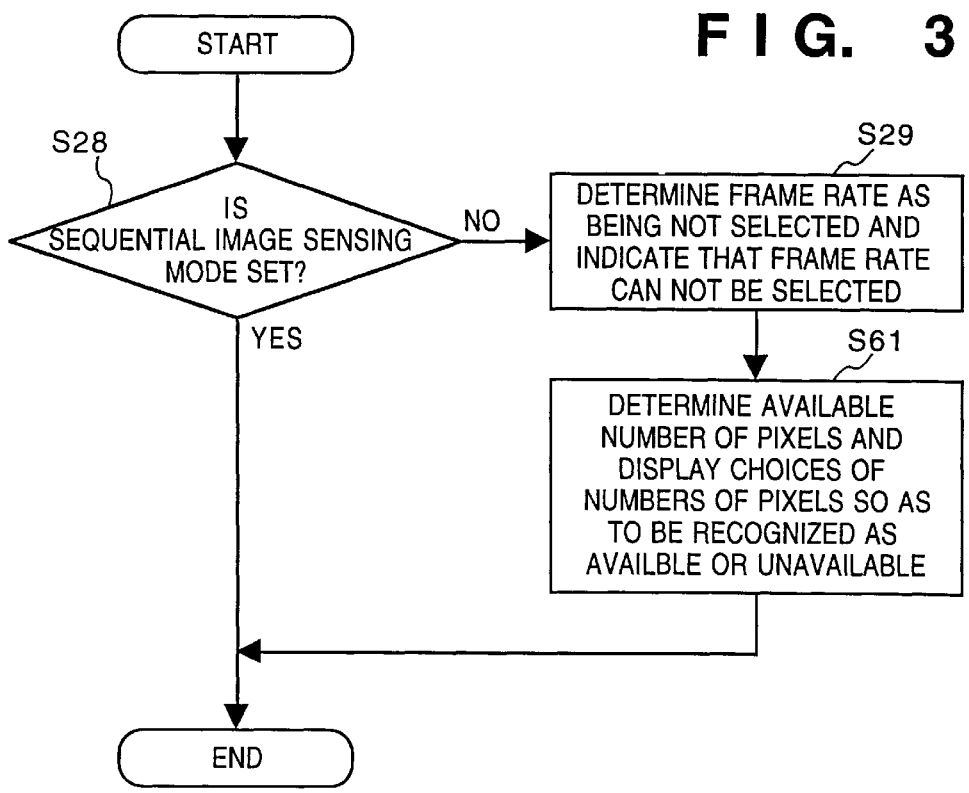
FIG. 3 is a flowchart showing a detailed flow of step S10 in FIG. 1, for selecting an image sensing mode.

FIG. 3 is a flowchart showing an operation sequence at step S10 in FIG. 1, for selecting an image sensing mode. At step S28, when it is determined that the single image sensing mode is set, then at step S29, frame rate is determined as not being selected, and the portion 306 for selecting the frame rate is displayed in pale color, as shown in FIG. 12, so as to indicate that the frame rate can not be selected. Next at step S61, the available choices for the number of pixels, determined in accordance with the available capacity of the memory, are displayed in the dark color to indicate that selection can be made out of these choices.

Figure 4:
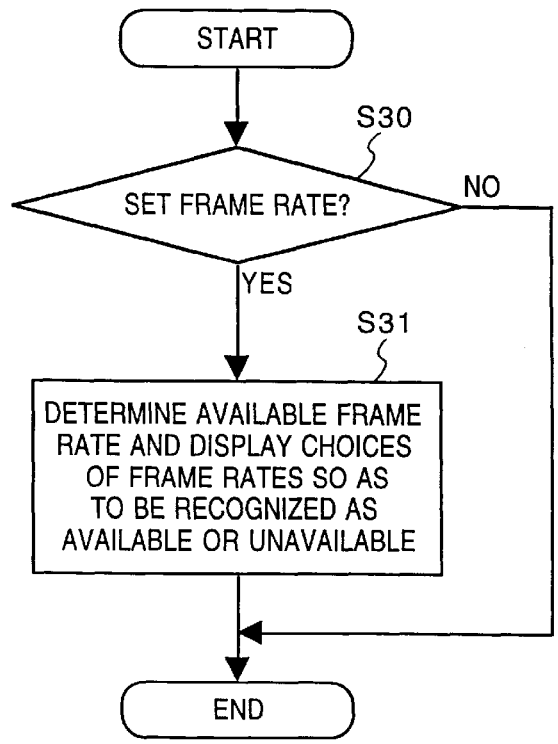
FIG. 4 is a flowchart showing a detailed flow of step S10 in FIG. 1, for selecting and setting a frame rate.

FIG. 4 is a flowchart showing a detailed flow of step S10 in FIG. 1, for selecting and setting a frame rate, and FIG. 13 shows an example of a displayed image when selecting a frame rate. When it is selected to set a frame rate at step S30 in FIG. 4, then at step S31, available frame rate or rates (available choices) are determined on the basis of the recording speed of the current recording medium and the number of pixels and compression ratio which are currently selected and displayed in dark color, whereas the unavailable choices are displayed in pale color.

Figure 5:
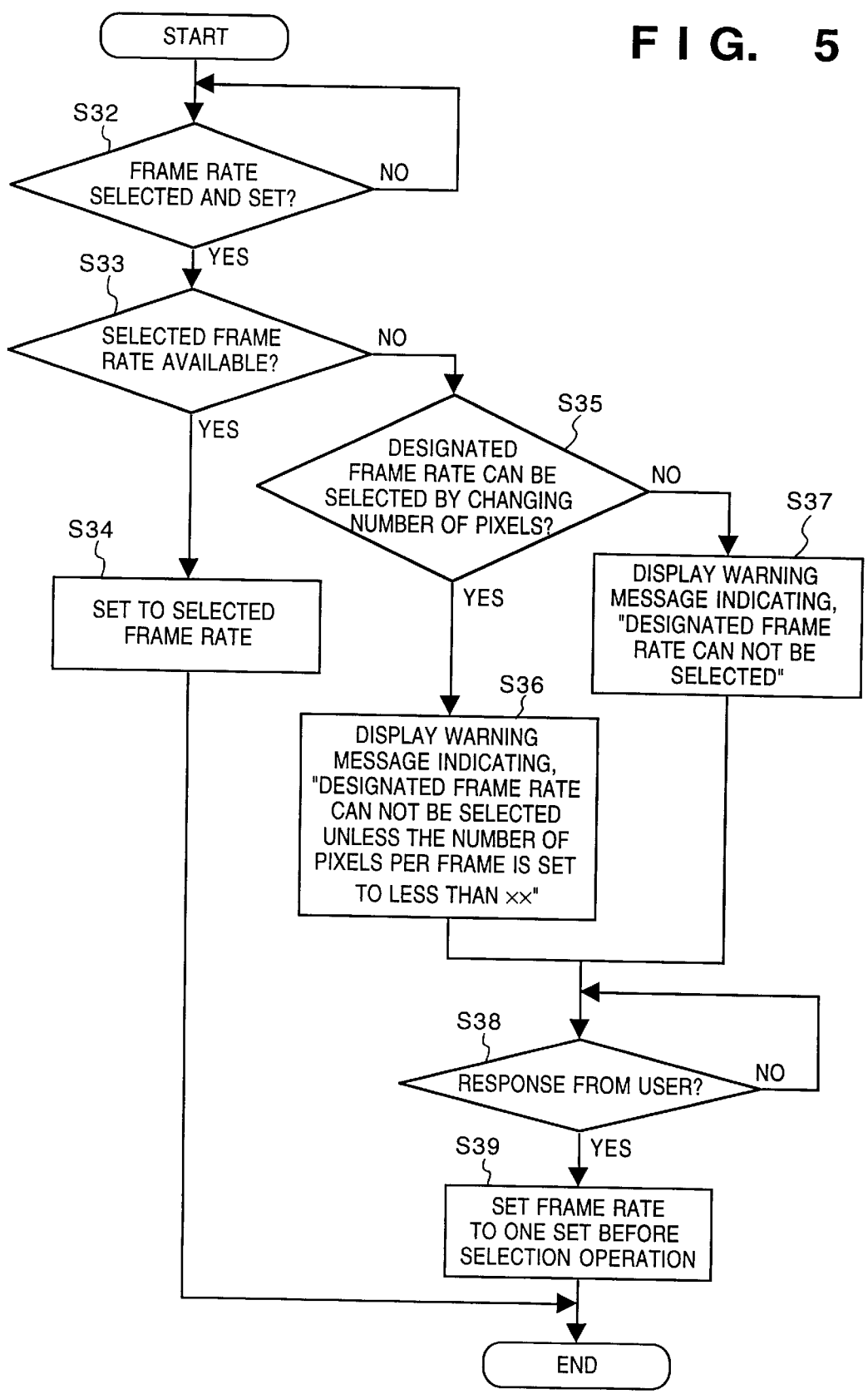
FIG. 5 is a flowchart showing a detailed flow of step S31 in FIG. 4.

FIG. 5 is a flowchart showing a detailed flow of step S31 in FIG. 4. When the user selects and sets a frame rate at step S32, it is determined at step S33 whether or not the selected frame rate is available. If the selected frame rate is available under conditions of the currently selected number of pixels and compression ratio and the recording speed of the recording medium, then the selected frame is set at step S34.

Figure 15:
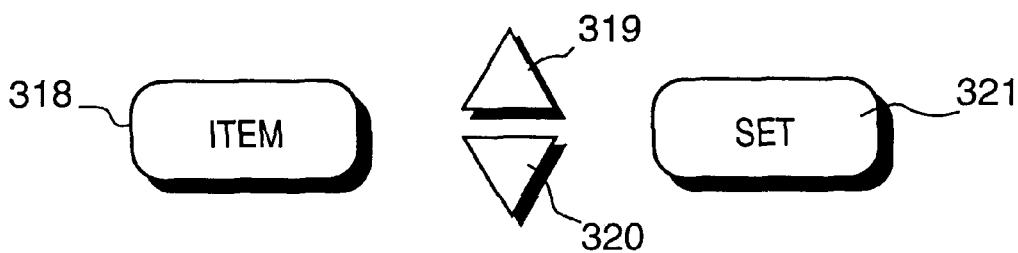
FIG. 15 is an example of displayed warning when a frame rate which cannot be set is selected at step S36 in FIG. 5.

Whereas, if it is determined at step S35 that the selected frame can not be set at step S33 and that the frame rate can be selected if the number of pixels is changed, then a warning message indicating that "Designated frame rate can not be selected unless the number of pixels per frame is set to less than XX" is displayed at step S36. FIG. 15 shows an example of the warning message. When there is a response from the user at step S38, the frame rate is set to the one set before the selection operation at step S39.

Whereas, if it is determined at step S35 that the selected frame rate can not be changed to "available" even after changing the number of pixels, a warming message indicating that "Designated frame rate can not be selected" is displayed at step S37. When there is a response from the user at step S38, the frame rate is set to the one set before the selection operation at step S39.

Figure 6:
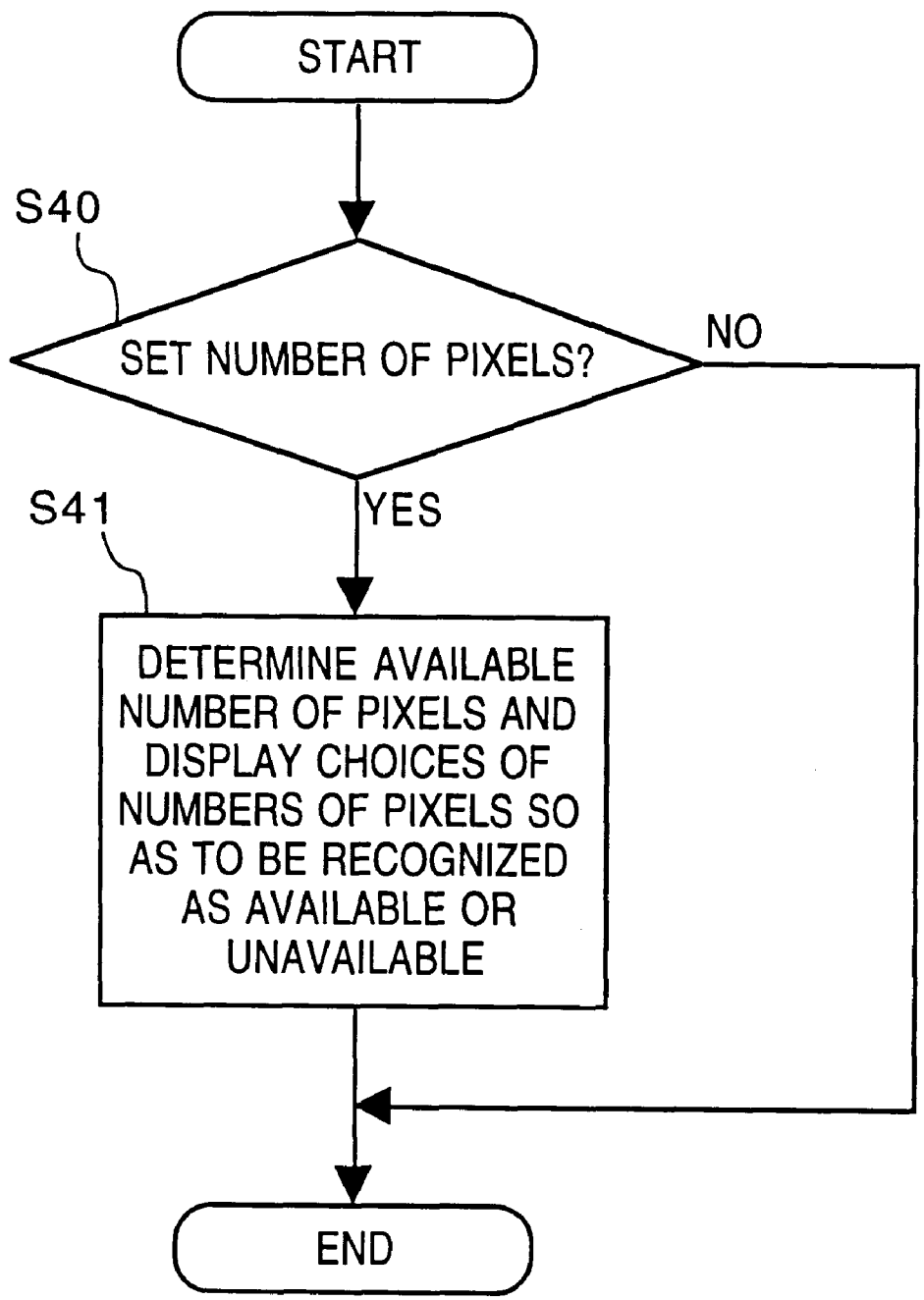
FIG. 6 is a flowchart showing a detailed flow of step S10 in FIG. 1, for selecting and setting the number of pixels per frame.

FIG. 6 is a flowchart showing a detailed flow of step S10 in FIG. 1, for selecting and setting the number of pixels per frame. When the portion 310 for selecting the number of pixels is selected at step S40, the available number or numbers of pixels (available choices) are determined on the basis of the recording speed of the current recording medium and the frame rate and compression ratio which are currently selected and displayed in dark color, whereas the unavailable choices are displayed in pale color at step S41.

Figure 7:
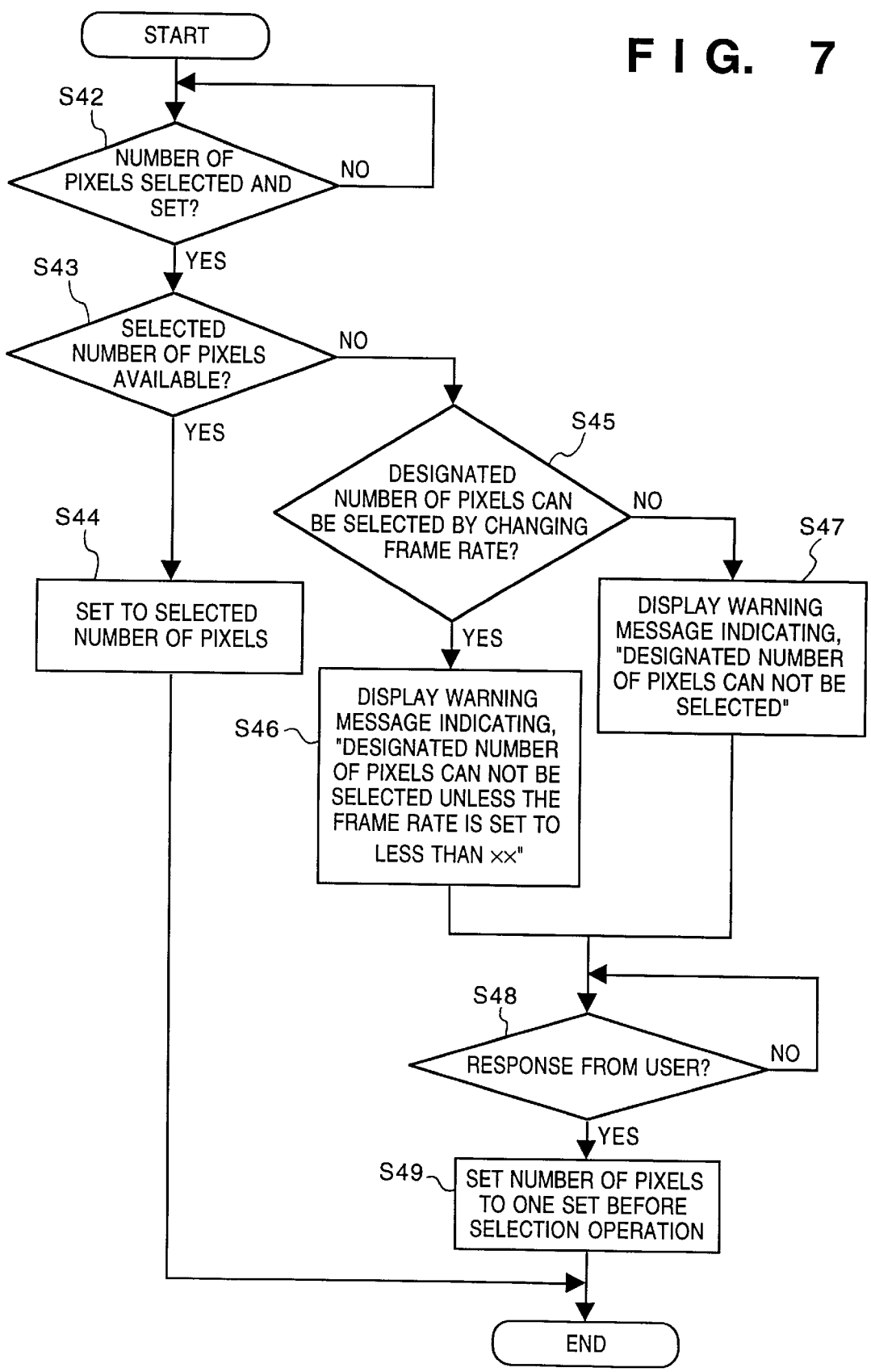
FIG. 7 is a flowchart showing a detailed flow of step 41 in FIG. 6, for setting the number of pixels per frame.

FIG. 7 is a flowchart showing a detailed flow of step 41 in FIG. 6, for setting the number of pixels per frame. If it is determined at step S43 that the number of pixels selected at step S42 is the available one, the selected number of pixels is set at step S44.

Whereas, if it is determined at step S43 that the selected number of pixels can not be set, then it is determined at step S45 whether or not it is possible to set the selected number of pixels after changing the frame rate. If it is possible, then a warning message indicating that "Designated number of pixels can not be selected unless the frame rate is set to less than XX" is displayed at step S46. Whereas, if it is determined at step S45 that it is not possible to set the selected number of pixels even after the frame rate is changed, a warming message indicating that "Designated number of pixels can not be selected" is displayed at step S47. After step S46 or S47, the process moves to step S48. When there is a response from the user, then the number of pixels is set to the one set before the selection operation at step S49.

<Second Embodiment>

Figure 9:
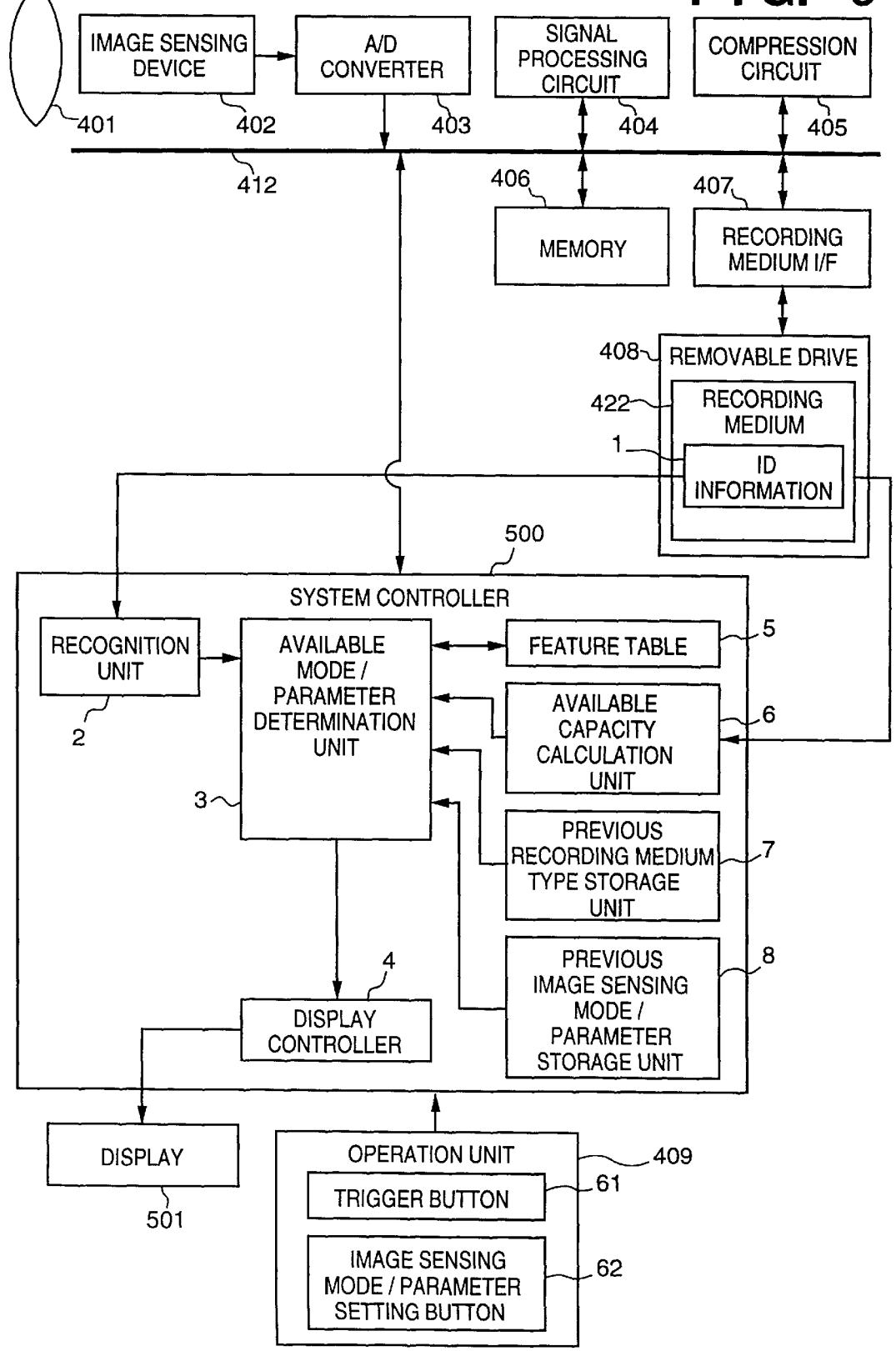
FIG. 9 is a block diagram illustrating a configuration of an image sensing and recording apparatus according to a second embodiment.

FIG. 9 is a block diagram illustrating a configuration of the image sensing and recording apparatus according to the second embodiment. Referring to FIG. 9, what is different from FIG. 8 described in the first embodiment is that the ID information 1 for identifying the type of a recording medium is written in a removable recording medium 422. Other parts and elements are the same as those in the first embodiment.

In the first embodiment, the recording speed of a recording medium is obtained from the feature table 5 by using the ID information 1 as a key to the feature table 5, thereby determining the available image sensing mode or modes and image sensing parameter or parameters. However, it is possible to hold the recording speed as the ID information 1 and to store the recording speed of the previous recording medium in the previous recording medium type storage unit 7. In this case, the feature table 5 is omitted.

<Third Embodiment>

Figure 10:
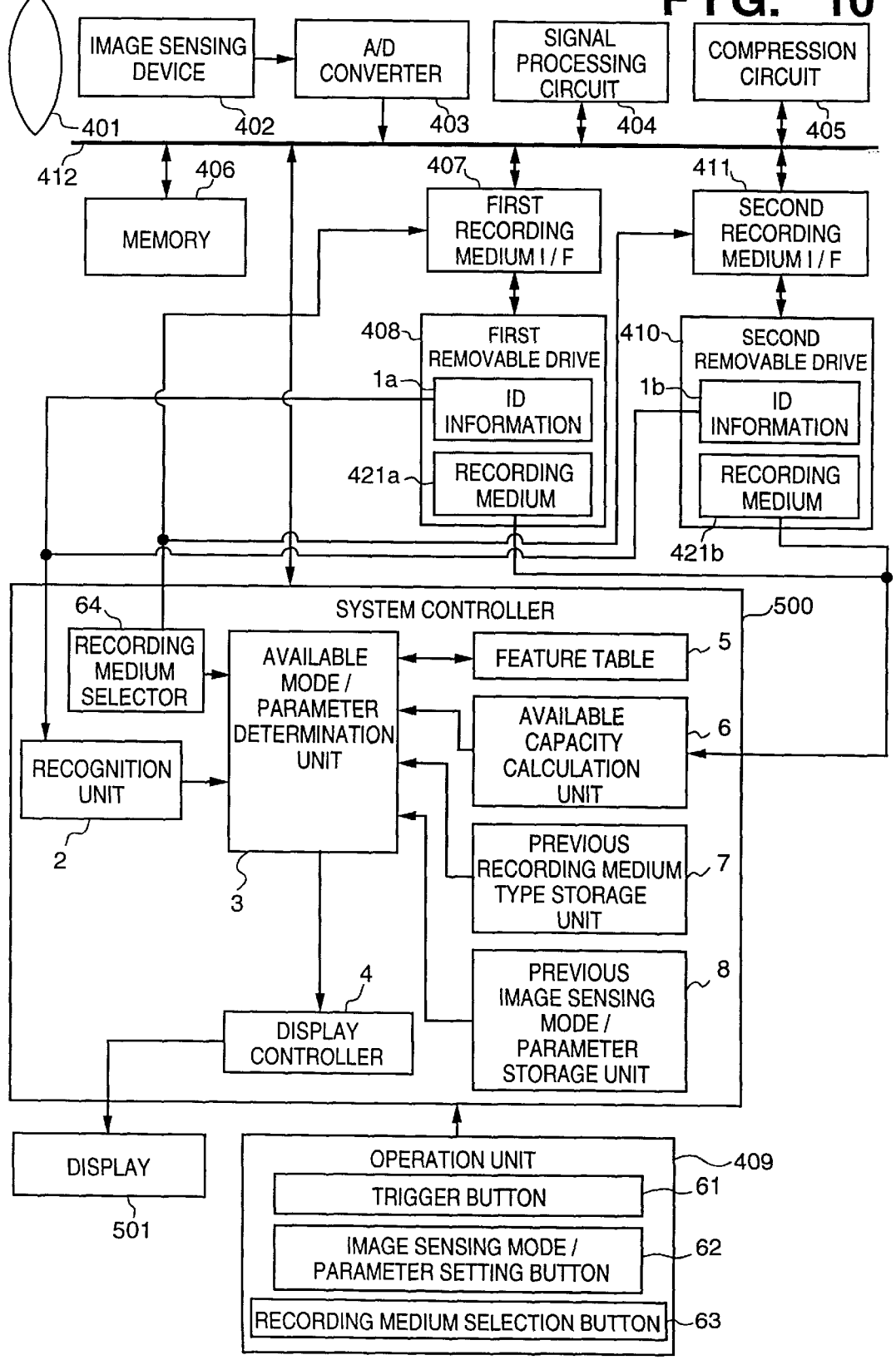
FIG. 10 is a block diagram illustrating a configuration of an image sensing and recording apparatus according to a third embodiment.

FIG. 10 is a block diagram illustrating a configuration of the image sensing and recording apparatus according to the third embodiment. In FIG. 10, what is different from FIG. 8 described in the first embodiment is that there are two drives. In FIG. 10, reference numeral 408 denotes a first drive; 410, a second drive; 407, a first recording medium interface (I/F) for the first recording medium for interfacing between the first drive 408 and the data bus 412; and 411, a second recording medium interface (I/F) for the second recording medium for interfacing between the second drive 410 and the data bus 412.

Further, reference numeral 64 denotes a recording medium selector; and 63, a recording medium selection button. The drive selected by operating the recording medium selection button 63 is selected by the recording medium selector 64, and data is read and written from/to the selected recording medium via the data bus 412. In such a system, two types of recording media can be used without exchanging drives. Other processes except the operation for selecting on of these two types of drives are the same as those in the first embodiment.

Note, in the third embodiment, the type of the drive is obtained as ID information 1a or 1b of the recording medium, and the recording speed of the recording medium is obtained by referring to the feature table 5. Here, it is possible for the feature table 5 to have characteristics of plural types of recording media in advance. However, in a case where a recording medium whose feature data is not on the feature table 5 is connected, a measured result obtained by recording test data in an available (empty) area of the recording medium may be stored in the feature table 5.

According to the first to third embodiments as described above, in an image sensing and recording apparatus capable of using various types of recording media by exchanging or switching them, a user can perform image sensing operation by using various types of recording media without failure without considering about the feature of the set or selected recording medium.

Further, the user does not have to perform trial and error for determining which image sensing mode or modes and which image sensing parameter or parameters can be used depending upon the set or selected recording medium, which greatly increases the operability of the image sensing and recording apparatus.

Furthermore, if the recording speed of a current recording medium is faster than that of a previous recording medium, a previous image sensing mode and image sensing parameter or parameters are used, which allows the user to start image sensing operation just after the recording media are exchanged without setting a image sensing mode or parameter.

The present invention is not limited to the above embodiments and various changes and modifications can be made within the spirit and scope of the present invention. Therefore to appraise the public of the scope of the present invention, the following claims are made.

What is claimed is:

1. An image sensing and recording apparatus capable of recording image data on plural types of removable recording media, said apparatus comprising:

recognition means for recognizing a recording speed of a recording medium;

available mode determination means for classifying image sensing modes which are set in advance into an available image sensing mode and an unavailable image sensing mode in accordance with the recording speed recognized by said recognition means;

available parameter determination means for classifying image sensing parameters which are set in advance into an available image sensing parameter and an unavailable image sensing parameter in accordance with the recording speed recognized by said recognition means and the image sensing modes; and display means for informing a user of the available image sensing mode differently from said unavailable image sensing mode classified by said available mode determination means and/or the available image sensing parameter differently from said unavailable image sensing parameter classified by said available parameter determination means before the user selects an image sensing mode and image sensing parameter.

2. The image sensing and recording apparatus according to claim 1, wherein the image sensing modes includes a single image sensing mode for sensing a single still image and a sequential image sensing mode for sequentially sensing a plurality of images.

3. The image sensing and recording apparatus according to claim 2, wherein in a case where the recording speed of the recording medium recognized by said recognition means is less than a predetermined value, the single image sensing mode is set as a model image sensing mode.

4. The image sensing and recording apparatus according to claim 2, wherein the image sensing parameters are classified into plural kinds, including a number of pixels per frame and a frame rate for the sequential image sensing mode, and each kind includes a plurality of choices of parameters.

5. The image sensing and recording apparatus according to claim 4 further comprising:

mode input means used for manually selecting one of the available image sensing mode or modes determined by said available mode determination means; and parameter input means used for manually selecting one of the available image sensing parameter or parameters determined by said available parameter determination means, wherein, when the single image sensing mode is selected, selection operation by said parameter input means for selecting a frame rate is disabled.

6. The image sensing and recording apparatus according to claim 5 further comprising compression means for compressing the image data, wherein, when the sequential image sensing mode is selected, said available parameter determination means determines available frame rate or rates on the basis of the recording speed of the recording medium recognized by said recognition means, a compression ratio used by said compression means, and a currently selected number of pixels per frame.

7. The image sensing and recording apparatus according to claim 6, wherein, when an unavailable frame rate is selected, if the selected unavailable frame rate is changed to available by changing the currently selected number of pixels per frame, a message indicating that the selected frame rate becomes available by changing the number of pixels per frame is displayed on said display means, and if the selected unavailable frame rate is not changed to available by changing the currently selected number of pixels per frame, a message indicating that the selected frame rate is not available is displayed on said display means.

8. The image sensing and recording apparatus according to claim 4 further comprising compression means for compressing the image data, wherein, when the sequential image sensing mode is selected, said available parameter determination means determines available number or numbers of pixels per frame on the basis of the recording speed of the recording medium recognized by said recognition means, a compression ratio used by said compression means, and a currently selected frame rate.

9. The image sensing and recording apparatus according to claim 8, wherein, when an unavailable number of pixels per frame is selected, if the selected unavailable number of pixels per frame is changed to available by changing the currently selected frame rate, a message indicating that the selected number of pixels per frame becomes available by changing the frame rate is displayed on said display means, and if the selected unavailable number of pixels per frame is not changed available by changing the currently selected frame rate, a message indicating that the selected number of pixels per frame is not available is displayed on said display means.

10. The image sensing and recording apparatus according to claim 4, further comprising compression means for compressing the image data.

11. The image sensing and recording apparatus according to claim 10, wherein said available mode determination means determines the sequential image sensing mode as available when the recording speed recognized by said recognition means is equal or greater than a minimum required recording speed which is determined on the basis of a compression ratio used by said compression means and a minimum number of pixels per frame and a minimum frame rate which are set in said image sensing and recording apparatus in advance, and as unavailable when the recording speed recognized by said recognition means is less than the minimum required recording speed.

12. The image sensing and recording apparatus according to claim 10, wherein, when the sequential image sensing mode is selected, said available parameter determination means determines the available parameter or parameters on the basis of the recording speed of the recording medium recognized by said recognition means and a compression ratio used by said compression means.

13. The image sensing and recording apparatus according to claim 10 further comprising model parameter determination means for, when the sequential image sensing mode is selected, determining model parameters on the basis of the recording speed of the recording medium recognized by said recognition means and a compression ratio used by said compression means.

14. The image sensing and recording apparatus according to claim 13, wherein, when the sequential image sensing mode is selected, said model parameter determination means determines a model frame rate and a model number of pixels per frame so that the model frame rate is maximum.

15. The image sensing and recording apparatus according to claim 13, wherein, when the sequential image sensing mode is selected, said model parameter determination means determines a model frame rate and a model number of pixels per frame so that the model number of pixels per frame is maximum.

16. The image sensing and recording apparatus according to claim 10 further comprising:

available capacity recognition means for recognizing an available capacity of the recording medium; and model parameter determination means for, when the single image sensing mode is selected, determining a model number of pixels per frame in accordance with a compression ratio used by said compression means and the available capacity of the recording medium recognized by said available capacity recognition means.

17. The image sensing and recording apparatus according to claim 16, wherein, when the single image sensing mode is selected, said model parameter determination means determines the model number of pixels per frame so that the model number of pixels per frame is maximum within the available capacity of the recording medium.

18. The image sensing and recording apparatus according to claim 1 further comprising storage means for storing information used for recognizing a recording speed, an image sensing mode, and an image sensing parameter or parameters of the recording medium before it is removed when changing recording media, wherein if a recording speed of a recording medium after changing recording media is equal or faster than the recording speed of the recording medium before changing recording media, the image sensing mode and the image sensing parameter or parameters stored in said storage means are set as a model image sensing mode and a model image sensing parameter or parameters.

19. The image sensing and recording apparatus according to claim 1, wherein said recognition means recognizes the recording speed of the recording medium on the basis of recording medium identification information recorded on the recording medium.

20. The image sensing and recording apparatus according to claim 19, further comprising:

a plurality of interfaces for connecting to a plurality of drives for driving a plurality of recording media; and recording medium selection means for selecting one of the plurality of recording media driven by the drivers connected to said plurality of interfaces.

21. The image sensing and recording apparatus according to claim 19, wherein the recording medium is a PC card of PC card Standard, and the recording medium identification information is recorded in a table.

22. The image sensing and recording apparatus according to claim 1, wherein said recognition means recognizes the recording speed of the recording medium on the basis of recording medium identification information recorded on a removable drive.

23. The image sensing and recording apparatus according to claim 22, further comprising:
   a plurality of interfaces for connecting to a plurality of removable drives for driving recording media; and
   recording medium selection means for selecting one of the plurality of removable drives connected to said plurality of interfaces.

24. The image sensing and recording apparatus according to claim 22, wherein the removable drive is a PC card of PC Card Standard, and the recording medium identification information is recorded in table.

25. An image sensing and recording method for recording image data on plural types of removable recording media, said method comprising:
   a recognition step of recognizing a recording speed of a recording medium,
   an available mode determination step of classifying image sensing modes which are set in advance into an available image sensing mode and an unavailable image sensing mode in accordance with the recording speed recognized at said recognition step;
   an available parameter determination step of classifying image sensing parameters which are set in advance into an unavailable image sensing parameter and an unavailable image sensing parameter in accordance with the recording speed recognized at said recognition step and the image sensing modes; and
   a display step of informing a user of the available image sensing mode differently from said unavailable image sensing mode classified at said available mode determination step and/or the available image sensing parameter differently from said unavailable image sensing parameter classified at said available parameter determination step before the user selects an image sensing mode and image sensing parameter.

26. The image sensing and recording method according to claim 25, wherein the image sensing modes includes a single image sensing mode for sensing a single still image and a sequential image sensing mode for sequentially sensing a plurality of images.

27. The image sensing and recording method according to claim 26, wherein in a case where the recording speed of the recording medium recognized at said recognition step is less than a predetermined value, the single image sensing mode is set as a model image sensing mode.

28. The image sensing and recording method according to claim 26, wherein the image sensing parameters are classified into plural kinds, including a number of pixels per frame and a frame rate for the sequential image sensing mode, and each kind includes a plurality of choices of parameters.

29. The image sensing and recording method according to claim 28 further comprising:
   a mode input step of manually selecting one of the available image sensing mode or modes determined at said available mode determination step; and
   a parameter input step of manually selecting one of the available image sensing parameter or parameters determined at said available parameter determination step, wherein, when the single image sensing mode is selected, selection operation at said parameter input step of selecting a frame rate is disabled.

30. The image sensing and recording method according to claim 29 further comprising a compression step of compressing the image data,
   wherein, when the sequential image sensing mode is selected, at said available parameter determination step, available frame rate or rates are determined on the basis of the recording speed of the recording medium recognized at said recognition step, a compression ratio used at said compression step, and a currently selected number of pixels per frame.

31. The image sensing and recording method according to claim 30, further comprising:
   a step of displaying a message indicating that the selected frame rate becomes available by changing the number of pixels per frame if an unavailable frame rate is selected, and if the selected unavailable frame rate is changed to available by changing the currently selected number of pixels per frame; and
   a step of displaying a message indicating that the selected frame rate is not available if an unavailable frame rate is selected, and if the selected unavailable frame rate is not changed to available by changing the currently selected number of pixels per frame.

32. The image sensing and recording method according to claim 29 further comprising a compression step of compressing the image data,
   wherein, when the sequential image sensing mode is selected, at said available parameter determination step, available number or numbers of pixels per frame are determined on the basis of the recording speed of the recording medium recognized at said recognition step, a compression ratio used at said compression step, and a currently selected frame rate.

33. The image sensing and recording method according to claim 32 further comprising:
   a step of displaying a message indicating that the selected number of pixels per frame becomes available by changing the frame rate if an unavailable number of pixels per frame is selected, and if the selected unavailable number of pixels per frame is changed to available by changing the currently selected frame rate; and
   a step of displaying a message indicating that the selected number of pixels per frame is not available if an unavailable number of pixels per frame is selected, and if the selected unavailable number of pixels per frame is not changed available by changing the currently selected frame rate.

34. The image sensing and recording method according to claim 28, further comprising a compression step of compressing the image data.

35. The image sensing and recording method according to claim 34, wherein, at said available mode determination step, the sequential image sensing mode is determined as available when the recording speed recognized at said recognition step is equal or greater than a minimum required recording speed which is determined on the basis of a compression ratio used at said compression step and a minimum number of pixels per frame and a minimum frame rate which are set in advance, and as unavailable when the recording speed recognized at said recognition step is less than the minimum required recording speed.

36. The image sensing and recording method according to claim 34, wherein, when the sequential image sensing mode is selected, at said available parameter determination step, the available parameter or parameters are determined on the basis of the recording speed of the recording medium recognized at said recognition step and a compression ratio used at said compression step.

37. The image sensing and recording method according to claim 34 further comprising a model parameter determination step of, when the sequential image sensing mode is selected, determining model parameters on the basis of the recording speed of the recording medium recognized at said recognition step and a compression ratio used at said compression step.

38. The image sensing and recording method according to claim 37, wherein, when the sequential image sensing mode is selected, at said model parameter determination step, a model frame rate and a model number of pixels per frame are determined so that the model frame rate is maximum.

39. The image sensing and recording method according to claim 37, wherein, when the sequential image sensing mode is selected, at said model parameter determination step, a model frame rate and a model number of pixels per frame are determined so that the model number of pixels per frame is maximum.

40. The image sensing and recording method according to claim 34 further comprising:
an available capacity recognition step of recognizing an available capacity of the recording medium; and
a model parameter determination step of, when the single image sensing mode is selected, determining a model number of pixels per frame in accordance with a compression ratio used at said compression step and the available capacity of the recording medium recognized at said available capacity recognition step.

41. The image sensing and recording method according to claim 40, wherein, when the single image sensing mode is selected, at said model parameter determination step, the model number of pixels per frame is determined so that the model number of pixels per frame is maximum within the available capacity of the recording medium.

42. The image sensing and recording method according to claim 25 further comprising a storage step of storing information used for recognizing a recording speed, an image sensing mode, and an image sensing parameter or parameters of the recording medium before it is removed when changing recording media,
wherein if a recording speed of a recording medium after changing recording media is equal or faster than the recording speed of the recording medium before changing recording media, the image sensing mode and the image sensing parameter or parameters stored at said storage step are set as a model image sensing mode and a model image sensing parameter or parameters.

43. The image sensing and recording method according to claim 25, wherein, at said recognition step, the recording speed of the recording medium is recognized on the basis of recording medium identification information recorded on the recording medium.

44. The image sensing and recording method according to claim 43, further comprising:
a step of interfacing to a plurality of drives for driving a plurality of recording media; and
a step of selecting one of the plurality of recording media driven by the drivers.

45. The image sensing and recording method according to claim 43, wherein the recording medium is a PC card of PC Card Standard, and the recording medium identification information is recorded in table.

46. The image sensing and recording method according to claim 25, wherein, at said recognition step, the recording speed of the recording medium is recognized on the basis of recording medium identification information recorded on a removable drive.

47. The image sensing and recording method according to claim 46, further comprising:
a step of interfacing to a plurality of removable drives for driving recording media; and
a step of selecting one of the plurality of removable drives.

48. The image sensing and recording method according to claim 46, wherein the removable drive is a PC card of PC Card Standard, and the recording medium identification information is recorded in table.

49. An image signal forming apparatus comprising:
a recognition unit capable of recognizing a recording speed information of a removable recording unit;
a determining unit capable of determining a first proper image signal forming condition among a plurality of image signal forming conditions according to the recording speed information recognized by said recognition unit; and
a display unit capable of displaying said first proper image signal forming condition and a second image signal forming condition, wherein said first proper image signal forming condition is displayed differently from said second image signal forming condition before a user selects one of said plurality of image signal forming conditions.

50. The image signal forming apparatus according to claim 49, wherein said recognition unit recognizes said recording speed information by communicating with said recording unit.

51. The image signal forming apparatus according to claim 49, wherein said image signal forming conditions include an image sensing mode.

52. The image signal forming apparatus according to claim 49, wherein said image signal forming conditions include a frame rate.

53. The image signal forming apparatus according to claim 49, wherein said image signal forming conditions include an amount of information per frame.

54. The image signal forming apparatus according to claim 49, wherein said image signal forming conditions include a combination of at least two of an image sensing mode, a frame rate, and an amount of information per frame.

55. The image signal forming apparatus according to claim 49, wherein said display unit displays said proper image signal forming condition differently from another image signal forming condition before a user selects one of said plurality of image signal forming conditions by not displaying said other image signal forming condition.

56. The image signal forming apparatus according to claim 49, further comprising an image sensor for sensing an optical image.

57. An image signal forming method comprising:
recognizing a recording speed information of a removable recording unit;
determining a first proper image signal forming condition among a plurality of image signal forming conditions according to the recording speed information; and
displaying said first proper image signal forming condition and a second image signal forming condition, wherein said first proper image signal forming condition is displayed differently from said second image signal forming condition before a user selects one of said plurality of image signal forming conditions.

58. The image signal forming method according to claim 57, wherein said recording speed information is recognized by communication with said recording unit.

59. The image signal forming method according to claim 57, wherein said image signal forming conditions include an image sensing mode.

60. The image signal forming method according to claim 57, wherein said image signal forming conditions include a frame rate.

61. The image signal forming method according to claim 57, wherein said image signal forming conditions include an amount of information per frame.

62. The image signal forming method according to claim 57, wherein said image signal forming conditions include a combination of at least two of an image sensing mode, a frame rate, and an amount of information per frame.

63. The image signal forming method according to claim 57, wherein said proper image signal forming condition is displayed differently from another image signal forming condition before a user selects one of said plurality of image signal forming conditions by not displaying said other image signal forming condition.

64. The image signal forming method according to claim 61, further comprising sensing an optical image.

* * * * *

UNITED STATES PATENT AND TRADEMARK OFFICE
CERTIFICATE OF CORRECTION

PATENT NO. : 6,449,426 B1
DATED : September 10, 2002
INVENTOR(S) : Akira Suga et al.

It is certified that error appears in the above-identified patent and that said Letters Patent is hereby corrected as shown below:

<u>Title page,</u>
Item [57], ABSTRACT,
Line 5, "including-a single" should read -- including a single --.

<u>Column 1,</u>
Line 35, "it superiors" should read -- is superior --

<u>Column 7,</u>
Line 67, "step s S9" should read -- steps S9 --

<u>Column 8,</u>
Line 4, "FIG. 3. if" should read -- FIG. 3. If --

<u>Column 11,</u>
Line 30, "to claim 4 further" should read -- to claim 5 further --

<u>Column 13,</u>
Line 17, "recorded in table." should read -- recorded in a table. --

<u>Column 15,</u>
Line 67, "recorded in table." should read -- recorded in a table. --

<u>Column 16,</u>
Line 15, "recorded in table." should read -- recorded in a table --

UNITED STATES PATENT AND TRADEMARK OFFICE
CERTIFICATE OF CORRECTION

PATENT NO. : 6,449,426 B1
DATED : September 10, 2002
INVENTOR(S) : Akira Suga et al.

It is certified that error appears in the above-identified patent and that said Letters Patent is hereby corrected as shown below:

Column 18,
Line 12, "61, further" should read -- 57, further --

Signed and Sealed this

Fifteenth Day of April, 2003

JAMES E. ROGAN
*Director of the United States Patent and Trademark Office*